United States Patent [19]

Chlebowski

[11] Patent Number: 4,771,719
[45] Date of Patent: Sep. 20, 1988

[54] BOAT STANDOFF BRACKET

[76] Inventor: Dale Chlebowski, 28905 Harrison Rd., South Bend, Ind. 46619

[21] Appl. No.: 748,475

[22] Filed: Jun. 25, 1985

[51] Int. Cl.[4] .............................................. B63B 21/00
[52] U.S. Cl. ..................................... 114/230; 213/179
[58] Field of Search ........................ 114/230, 249-252; 213/175-176, 179; 280/414.1; 292/130

[56] References Cited

U.S. PATENT DOCUMENTS

| | | | |
|---|---|---|---|
| 309,966 | 12/1884 | Livingston | 213/179 |
| 534,905 | 2/1895 | Morton | 213/179 |
| 1,094,610 | 4/1914 | Steinhauer | 114/230 |
| 1,938,407 | 12/1933 | Thomas et al. | 213/179 |
| 2,155,043 | 4/1939 | Gorskey | 114/230 |
| 2,288,926 | 7/1942 | Strader | 292/99 |
| 2,447,945 | 8/1948 | Knowler | 114/230 |
| 2,565,580 | 8/1951 | Thoss | 114/230 |
| 2,930,339 | 3/1960 | Trnka | 114/230 |
| 2,965,064 | 12/1960 | Wallace | 114/230 |
| 2,996,033 | 8/1961 | Yordi | 114/230 |
| 3,060,885 | 10/1962 | Nolf | 114/230 |
| 3,133,521 | 5/1964 | Cappel | 114/230 |
| 3,442,241 | 5/1969 | Daunis | 114/230 |
| 3,763,815 | 10/1973 | Hodate | 114/230 |
| 3,837,316 | 9/1974 | Stratienko et al. | 114/249 |
| 4,193,368 | 3/1980 | De Graaf et al. | 114/230 |

FOREIGN PATENT DOCUMENTS 846584 8/1960 United Kingdom ............... 292/130

Primary Examiner—Sherman D. Basinger
Assistant Examiner—Jesús D. Sotelo
Attorney, Agent, or Firm—Barnes & Thornburg

[57] ABSTRACT

A standoff bracket arrangement, for securing boats to a landing structure, is provided having one member secured to the boat and another member secured to the landing structure and a gravity-actuated latch for cooperatively connecting these two members. Initial sliding engagement of the boat member with respect to the landing structure member causes the latch to be upwardly displaced, providing free access to a slotted portion in one member for a latchable portion in the other member. Further insertion of the latchable portion into the slotted portion permits the latch to be downwardly displaced under the influence of gravity to prevent removal of the latchable portion from the slotted portion. The latch also includes a cam surface slidably engagable by the latchable portion when within the slotted portion to cause downward displacement of the latch which also prevents removal of the latchable portion. The latchable portion is positively defined so as to prevent lateral sliding motion when within said slotted portion.

10 Claims, 3 Drawing Sheets

BOAT STANDOFF BRACKET

BACKGROUND AND SUMMARY OF THE INVENTION

The present invention relates generally to devices for securing and mooring boats to a landing structure, such as a dock or wharf. More particularly, this invention relates to standoff brackets for maintaining small boats in a fixed, positively defined location relative to the dock and other boats secured thereto.

Previously, medium-size and small boats and water craft have been moored to docks by lengths of rope and/or chain. However, such arrangements permit considerable movement of the boat along the water surface in response to wind and wave action. This movement often results in significant damage from rubbing or bumping of the boat so secured into other nearby boats and against the docks. Also, boats are not fixedly secured thereby such that extreme caution must be exercised upon boarding and disembarking from the boats.

Further, in large scale marinas it is desirable to eliminate movement between boats and the docks to positively locate each boat so that all available dockage space is most efficiently utilized. If each boat is assigned to a specific and narrowly defined location, the maximum number of boats per unit footage of dock is achieved. However, such arrangements can require a large number of locating devices in a given marina, and each boat must be equipped to be secured thereby.

To achieve widespread public acceptance, any such locating or mooring device must have a relatively low cost and be mechanically simple, easy to operate and maintain, and functionally reliable over long periods of time. It should also not require a specially adapted boat construction. Previous mechanical locating means have typically involved spring-loaded latches and complicated retaining brackets which are relatively expensive, awkward to operate and not easily retrofit onto pre-existing dock structures and boats. Further, to accommodate changes in water level, prior mechanical locators have employed elaborate adjustable mounts which require careful maintenance.

It is therefore an object of the present invention to provide an inexpensive and reliable device for securing water craft with an easily utilizable mechanism.

Another object is the provision of a device for positively locating a boat with respect to dockage and preventing excess movement of the boat at that location.

A further object is to provide a device for fixedly securing a boat to facilitate entry to and exit from that boat.

Still another object is the provision of a simplified boat securing apparatus which can be readily retrofit onto pre-existing boats and dockage.

These and other objects of the present invention are attained in the provision of a standoff bracket arrangement, for securing boats to a landing structure, having one member secured to the boat and another member secured to the landing structure and a gravity-actuated latch for cooperatively connecting these two members. Initial sliding engagement of the boat member with respect to the landing structure member causes the latch to be upwardly displaced, providing free access to a slotted portion in one member for a latchable portion in the other member. Further insertion of the latchable portion in the other member. Further insertion of the latchable portion into the slotted portion permits the latch to be downwardly displaced under the influence of gravity to prevent removal of the latchable portion from the slotted portion. The latch also includes a cam surface slidably engageable by the latchable portion when within the slotted portion to cause downward displacement of the latch which also prevents removal of the latchable portion. The latchable portion is positively defined so as to prevent lateral sliding motion when within said slotted portion.

Other objects, advantages and novel features of the present invention will become readily apparent from consideration of the drawings herein and the detailed description of preferred embodiments below.

DESCRIPTION OF THE PREFERRED EMBODIMENTS

Figure 1:
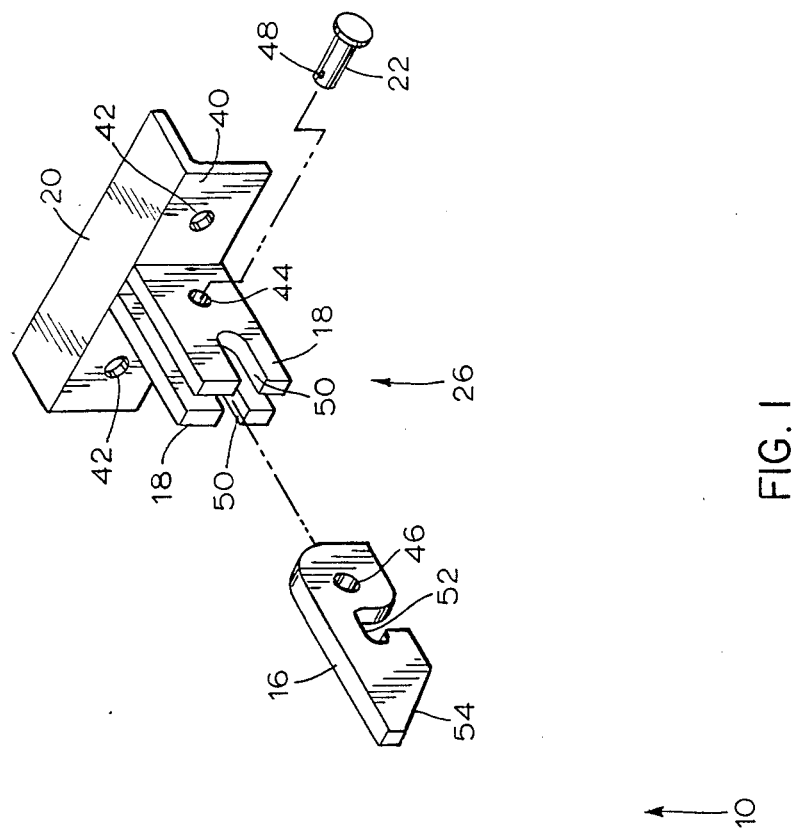
FIG. 1 shows an exploded view of a boat standoff bracket arrangement employing the present invention.
Figure 1:
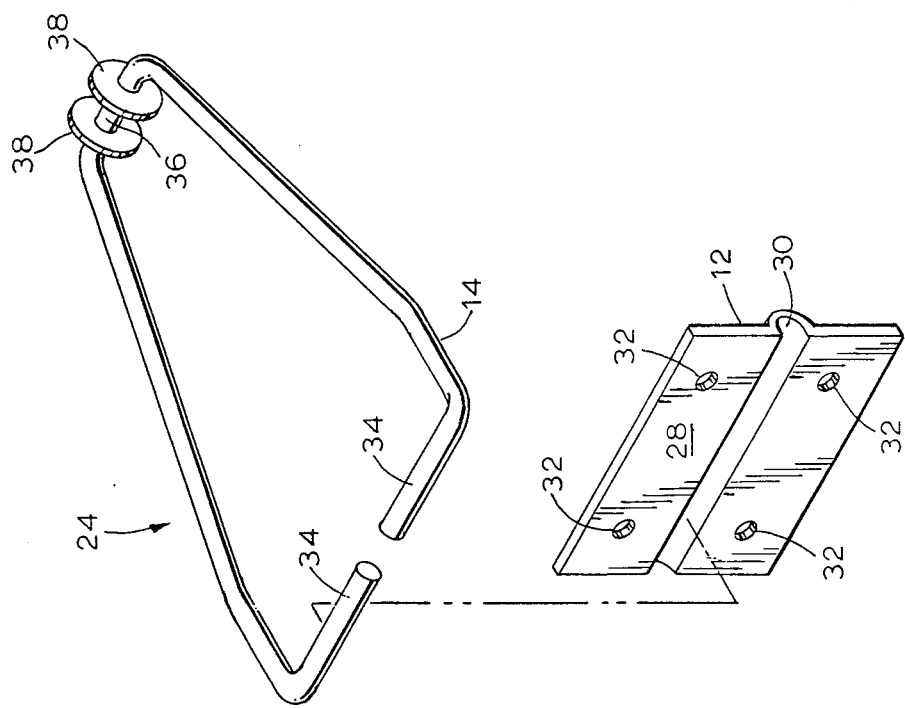

FIG. 1, which illustrates a preferred embodiment of the present invention, shows an exploded view of standoff bracket arrangement 10 having bracket element 12, loop element 14, latch 16, arms 18, bracket element 20, and pivot pin 22. When fully assembled, these elements form two seperable members, 24 and 26, one of which is secured to a landing structure or dock (not shown) and the other of which is secured to a boat (not shown). These two members are cooperatively engageable so as to positively locate the boat with respect to the dock despite wind and wave action and loading and unloading forces.

Bracket element 12 is preferably formed from a flat plate 28 having a recessed portion 30 therein. Recessed portion 30 is formed so that linear portion 34 of loop element 14 is movably received therein. A plurality of holes 32 are provided in plate 28 to permit bracket element 12 to be fixedly secured by, for example, screws or bolts (not shown) to either a dock or a boat. In either event, recessed portion 30 permits loop element 14 to be freely movable in at least one direction, as a hinge, with respect to fixed bracket element 12.

Loop element 14 is preferably formed from a bent or formed metal wire element and includes latchable portion 36 defined between stops 38. These stops are preferably spaced apart flat washers which are welded to the metal wire element.

Bracket element 20 is preferably formed from a length of angle iron with a pair of arms 18, formed from metal plate, welded to an outer side 40 of bracket element 20 in a parallel, spaced apart relation. Bracket element 20 includes a plurality of holes 42 to permit the bracket to be fixedly secured by, for example, screws or bolts (not shown) to either a dock or a boat.

The spacing between arms 18 is preferably only so wide as to permit latch 16 to be freely movable therein. Arms 18 each include a pivot hole 44 therein. Latch 16 also includes a pivot hole 46. These pivot holes are aligned when latch 16 is between arms 18 such that pivot pin 22 passes therethrough and pivotally secures latch 16 to arms 18. Pivot pin 22 is provided with a hole 48 therethrough which can receive a cotter pin (not shown) to prevent pivot pin 22 from being removed from holes 44 and 46. Alternatively, pivot pin 22 can be formed as a rivet or bolt.

Arms 18 includes slots or recesses 50 which are dimensioned so as to receive latchable portion 36 therein. Latch 16 also includes a slot or recess 52 which is disposed such that, when latch 16 is pivotally mounted to arms 18, slots 50 and 52 are in lateral alignment and permit lateral passage therethrough. Slot 52 is likewise dimensioned to receive latchable portion 36.

Figure 2:
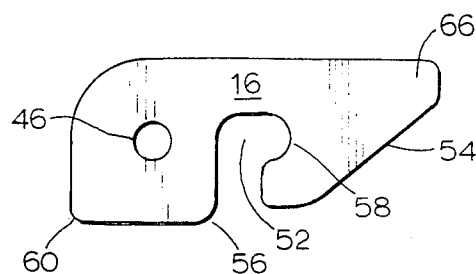
FIG. 2 shows a side view of the latch element employed in the bracket arrangement of FIG. 1.

As shown in FIG. 2, latch 16 is formed to further include inclined surface 54, cam surface 56, and hook portion 58. To assure proper alignment of slots 50 and 52 when latch 16 is pivoted to its lowermost or "at rest" position, pivot stop 60 is provided adjacent and engagable with bracket element 20. When latch 16 is in the at rest position, surface 54 blocks entry into slots 50. However, surface 54 is upwardly inclined with respect to the direction of travel of latchable portion 36 into slots 50. Thus, when latchable portion 36 is moved in the direction of entry into slots 50, latchable portion 36 slidably engages surface 54 causing latch 16 to pivot upwardly about pivot pin 22 until surface 54 no longer blocks entry into slots 50, as shown in the partial cross-sectional views of FIGS. 3 and 4, respectively.

Figures 3, 4:
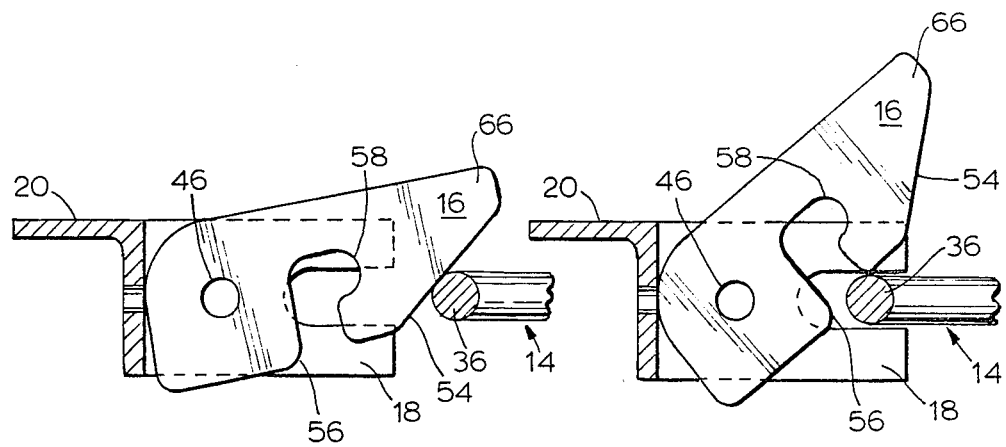
FIG. 3 shows a partial cross-sectional side view of the bracket arrangement of FIG. 1 during initial latching engagement.
FIG. 4 shows a partial cross-sectional side view of the bracket arrangement of FIG. 1 upon further latching engagement motion, as compared with the view of FIG. 3.
Figures 5, 6:
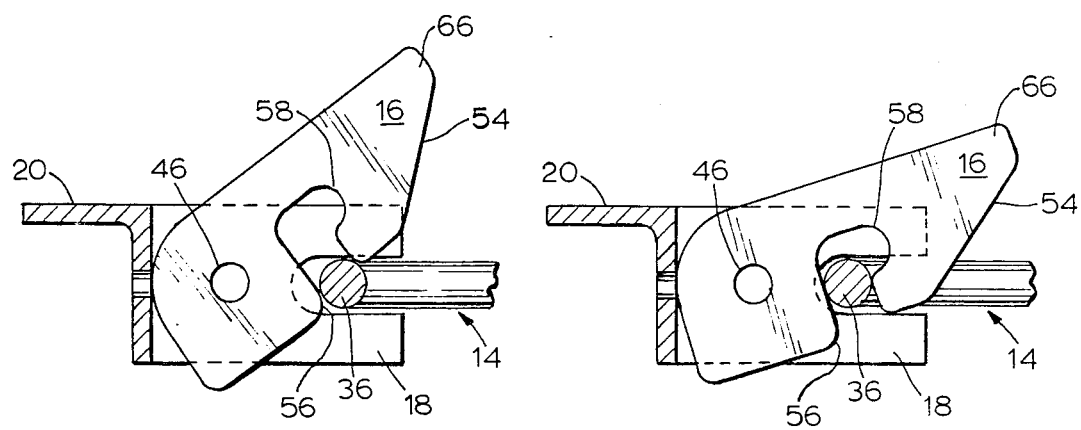
FIG. 5 shows a partial cross-sectional side view of the bracket arrangement of FIG. 1 upon further latching engagement motion, as compared with the view of FIG. 4.
FIG. 6 shows a partial cross-sectional side view of the bracket arrangement of FIG. 1 upon further latching engagement motion, as compared with the view of FIG. 5.
Figure 7:
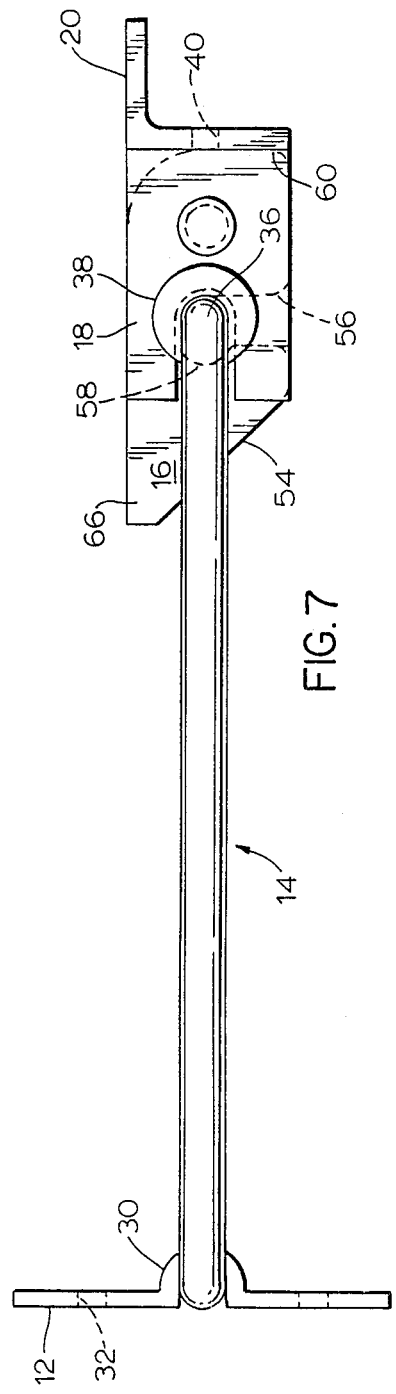
FIG. 7 shows a cross-sectional side view of the bracket arrangement of FIG. 1 in the latched position.

When latchable portion 36 continues to move leftwardly from the position shown in FIG. 4, that latchable portion will disengage from surface 56, as shown in FIG. 5. At this point, latch 16 is free to pivot downwardly under the influence of gravity to resume the at rest position, with hook portion 58 trapping latchable portion 36 within slot 52, as shown in FIG. 7.

Under some circmmstances, as where latchable portion 36 is very rapidly inserted into slots 50 or where substantial corrosion has reduced the ease of pivoting about pivot pin 22, latch 16 will not immediately drop to the at rest position as latchable portion 36 moves to the position shown in FIG. 5. In that event, further leftward movement of latchable portion 36 results in its sliding engagement with cam surface 56. That surface is curved so that such sliding engagement positively forces latch 16 to pivot downwardly to the at rest position, as shown in FIG. 6.

Figure 8:
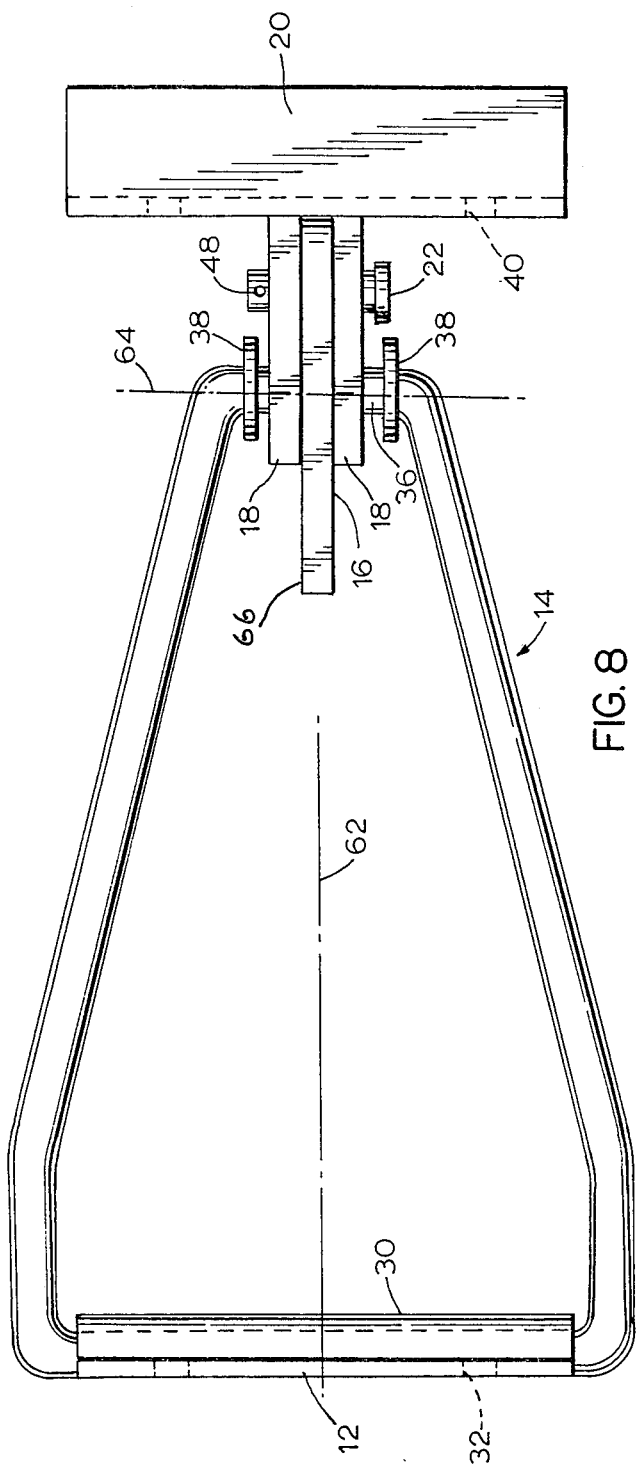
FIG. 8 shows a top view of the arrangement of FIG. 7.

Hook portion 58 is outwardly curved with respect to slot 52 such that latchable portion 36 cannot be withdrawn from slots 50 and 52 merely by rightward movement. Stops 38 are preferably spaced apart by a distance approximately equal to the lateral distance through slots 50 and 52, as shown in FIG. 8, such that lateral sliding of latchable portion 36 therein is prevented. The side-by-side arrangement, dimensioning, and spaced apart position of slots 50 with respect to latchable portion 36 preferably cooperate to prevent excessive tilting or rotational movement of loop element 14 with respect to longitudinal axis 62 of bracket arrangement 10. However, latchable portion 36 is permitted to freely rotate about lateral axis 64 through slots 50. In this manner, the boat is permitted to rise and fall with the water level even though the dock structure may be fixed.

In operation, bracket arrangement 10 is easily and nondestructively retrofit onto any pre-existing boat and dock structure. As indicated in FIGS. 3–7, uni-directional motion of latchable portion 36 is sufficient to automatically lock seperable members 24 and 26 together. This self-locking structure most easily retains the locking orientation under the influence of gravity. To permit latchable portion 36 to be released from slots 50 and 52, latch 16 is formed to include an extended portion 66 which projects beyond arms 18 to facilitate manual upward pivoting of latch 16. One or more of these bracket arrangements can be used on each boat side, depending usually upon the length of the boat.

Typically, bracket element 12 will be most conveniently secured to the dock structure and bracket element 20 to a boat, but the arrangement of the present invention can be utilized in a reversed orientation. Also, where loop element 14 is formed from a rigid, unexpansible material, locking engagement provides positive location which facilitates entry to and exit from the boat. Bracket arrangement 10 can be conveniently and unexpensively formed from cast metals, with minimal machining required.

While the present invention has been described and illustrated above in detail, it is to be clearly understood that the same is by way of illustration and example only, and is not to be taken by way of limitation. The spirit and scope of the present invention are limited only by the terms of the appended claims.

What is claimed is:

1. A boat standoff bracket arrangement, for securing small boats to a landing structure by limiting horizontal and vertical movement of the boat relative to the landing structure to a predetermined arc in a vertical plane, comprising:

a first member attached to one of said boat and said landing structure;

a second member attached to the other of said boat and said landing structure, said second member having a slotted portion for receiving said first member;

a hook means connected to said second member so as to be self-locking under the influence of gravity to prevent removal of said first member from said slotted portion;

said hook means having a surface portion inclined with respect to the direction of insertion of said first member into said slotted portion such that sliding engagement of said first member with said surface portion in said direction of insertion causes said hook means to shift away from said slotted portion and permit insertion of said first member into said slotted portion; and said hook means extending beyond said slotted portion opposing said direction of insertion so as to permit direct manual manipulation of said hook means to an unlocking position which permits removal of said first member from said slotted portion.

2. The arrangement according to claim 1 wherein said slotted portion includes a plurality of spaced apart plate members each having a cut-out slot extending from at least one side thereof, said cut-out slots being mutually aligned and parallel.

3. The arrangement according to claim 2 wherein said hook means is formed from another late member pivotally mounted between said spaced apart plate members, all of said plate members having top and bottom surfaces substantially flush along the same planes when said hook means prevents removal from said first member.

4. The arrangement according to claim 1 wherein said first member includes a loop element movably mounted to a bracket element.

5. The arrangement according to claim 1 wherein said first member includes a plurality of stop means thereon and the portion of said first member which is received by said slotted portion is defined between said stop means such that relative motion along said first member is prevented when said first member is so received.

6. The standoff bracket of claim 1 wherein said first member is linearly slidable into said slotted portion of said second member whereby removal and insertion of said first member into said slotted portion is accomplished by movement in one linear direction after said hook means is manually manipulated to an unlocked position.

7. A standoff bracket arrangement, for securing a boat to a dock, comprising:
a gravity-actuated latch member secured to one of said boat and said dock;
a loop means, secured to the other of said boat and said dock, for engagement with said latch member;
said latch member including at least one recessed means for receiving said loop means and including a restraining means, moveably connected with respect to said recessed means, for blocking entry of said loop means into said recessed means and for preventing removal of said loop means from said recessed means when received therein;
said restraining means including an inclined surface means for slidable engagement with said loop means and thereby upwardly displacing said restraining means from blocking entry of said loop means into said recessed means upon motion of said loop means towards said recessed means;
said restraining means further including an engaging means for engaging said loop means and thereby positively forcing said restraining means into a position such that said restraining means prevents removal of said loop means from said recessed means; and
said inclined surface means extending beyond said recessed means opposing the direction of insertion of said loop means into said recessed means so as to permit manual manipulation of said inclined surface means to upwardly displace said restraining means to an unlocking position which permits removal of said loop means from said recessed means.

8. The arrangement according to claim 7 wherein said engaging means includes a first cam surface slidably engagable by said loop means when received within said recessed means to downwardly displace said restraining means such that said restraining means prevents removal of said loop means from said recessed means.

9. The arrangement according to claim 7 wherein said restraining means is pivotally mounted with respect to said recessed means and is balanced such that under the influence of gravity it is biased toward a position where said loop means is prevented from disengaging from said latch member when said loop means is received within said recessed means.

10. A boat standoff bracket for securing small boats to a landing structure, comprising:
a first member attached to one of said boat and said landing structure;
a second member attached to the other of said boat and said landing structure;
said second member having a slotted portion for receiving said first member;
a hook means for preventing removal of said first member from said slotted portion;
said hook means being longitudinally extending and pivotally connected to said second member at one longitudinal end of said hook means so as to be pivotally locking against removal of said first member from said slotted portion under the influence of gravity;
said hook means having a shaped surface at its other longitudinal end;
said surface normally blocking access to said slotted portion and being inclined with respect to the direction of insertion of said first member into said slotted portion such that sliding engagement of said first member with said surface in the direction of insertion causes said hook means to pivot away from said slotted portion and permit insertion of said first member into said slotted portion; and
said shaped surface extending beyond said second member for a predetermined length so as to permit direct manual manipulation of said hook means to pivot said hook means to an unlocking position which permits removal of said first member from said slotted portion.

* * * * *

UNITED STATES PATENT AND TRADEMARK OFFICE
CERTIFICATE OF CORRECTION

PATENT NO. : 4,771,719

DATED : September 20, 1988

INVENTOR(S) : Dale Chlebowski

It is certified that error appears in the above-identified patent and that said Letters Patent is hereby corrected as shown below:

In Column 1, line 66 and 67, please delete "Further insertion of the latchable portion in the other member."

In Column 3, line 7, please delete "the" and insert therefor --that-- .

In Column 5, line 7, please delete "late" and insert therefor --plate--.

Signed and Sealed this

Fourteenth Day of March, 1989

Attest:

DONALD J. QUIGG

*Attesting Officer*   *Commissioner of Patents and Trademarks*